(12) United States Patent
Massard et al.

(10) Patent No.: US 10,094,337 B2
(45) Date of Patent: Oct. 9, 2018

(54) DUAL PATH COOLED EXHAUST GAS RECIRCULATION FOR TURBOCHARGED GASOLINE ENGINES

(71) Applicants: Nicolas Massard, Turin (IT); Alan G Falkowski, Lake Orion, MI (US); Thomas G Lawrence, Clarkston, MI (US); Massimo Fulfaro, Rochester Hills, MI (US)

(72) Inventors: Nicolas Massard, Turin (IT); Alan G Falkowski, Lake Orion, MI (US); Thomas G Lawrence, Clarkston, MI (US); Massimo Fulfaro, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 79 days.

(21) Appl. No.: 15/062,668

(22) Filed: Mar. 7, 2016

(65) Prior Publication Data

US 2016/0265485 A1 Sep. 15, 2016

Related U.S. Application Data

(60) Provisional application No. 62/130,779, filed on Mar. 10, 2015.

(51) Int. Cl.
*F02B 37/00* (2006.01)
*F02D 9/08* (2006.01)
(Continued)

(52) U.S. Cl.
CPC .............. *F02M 26/06* (2016.02); *F02D 9/08* (2013.01); *F02D 41/005* (2013.01);
(Continued)

(58) Field of Classification Search
CPC ........ F02M 26/06; F02M 26/13–26/44; F02M 2026/005; Y02T 10/47; Y02T 10/144;
(Continued)

(56) References Cited

U.S. PATENT DOCUMENTS 6,694,956 B2   2/2004   Kawaguchi et al.
6,899,090 B2   5/2005   Arnold
(Continued)

FOREIGN PATENT DOCUMENTS

DE   102008035553 A1 *   2/2010   ........... F01N 13/009
EP   1340904 A1   9/2003
(Continued)

OTHER PUBLICATIONS

International Search Report and Written Opinion dated Jun. 3, 2016 for International Application No. PCT/US2016/021425, International Filing Date Mar. 9, 2016.

*Primary Examiner* — Laert Dounis
(74) *Attorney, Agent, or Firm* — Ralph E Smith

(57) ABSTRACT

A dual path exhaust gas recirculation (EGR) system for an engine includes a common EGR intake path and first and second low pressure EGR paths including respective first and second EGR valves. The common EGR intake path is connected to the exhaust system downstream of a catalyst and includes an EGR cooler. The first EGR path is coupled directly to the EGR cooler and an inlet of a turbocompressor. The second EGR path is coupled directly to the EGR cooler and the intake system, thereby bypassing the turbocharger and an engine throttle valve. The engine includes an absence of any high pressure EGR path and the EGR valves are controlled such that the first EGR valve is closed and the second EGR valve is open at low engine speed and load
(Continued)

operating conditions thereby providing EGR directly to the intake system that bypasses the turbocharger and throttle valve.

7 Claims, 3 Drawing Sheets

(51) Int. Cl.

| | | |
|---|---|---|
| *F02M 26/06* | (2016.01) | |
| *F02M 26/07* | (2016.01) | |
| *F02M 26/22* | (2016.01) | |
| *F02M 26/35* | (2016.01) | |
| *F02M 26/38* | (2016.01) | |
| *F02M 26/44* | (2016.01) | |
| *F02M 26/21* | (2016.01) | |
| *F02M 26/20* | (2016.01) | |
| *F02M 26/00* | (2016.01) | |
| *F02D 41/00* | (2006.01) | |

(52) U.S. Cl.
CPC ............ *F02M 26/07* (2016.02); *F02M 26/21* (2016.02); *F02M 26/22* (2016.02); *F02M 26/35* (2016.02); *F02M 26/38* (2016.02); *F02M 26/44* (2016.02); *F02B 37/00* (2013.01); *F02D 41/0007* (2013.01); *F02D 41/0065* (2013.01); *F02M 26/20* (2016.02); *F02M 2026/005* (2016.02); *Y02T 10/144* (2013.01); *Y02T 10/47* (2013.01)

(58) Field of Classification Search
CPC . F02D 41/0047; F02D 41/005; F02D 41/0065
See application file for complete search history.

(56) References Cited

U.S. PATENT DOCUMENTS

| | | | |
|---|---|---|---|
| 6,945,236 B2 | 9/2005 | Nakai et al. | |
| 6,973,786 B1 * | 12/2005 | Liu | ......................... F02M 26/07 |
| | | | 123/559.2 |
| 7,673,618 B2 | 3/2010 | Hasegawa et al. | |
| 8,056,546 B2 | 11/2011 | Boyer et al. | |
| 8,230,675 B2 | 7/2012 | Pursifull et al. | |
| 8,353,275 B2 | 1/2013 | VanDerWege et al. | |
| 8,646,271 B2 | 2/2014 | Yasui et al. | |
| 2004/0244375 A1 * | 12/2004 | Kono | ...................... F02B 37/10 |
| | | | 60/605.2 |
| 2010/0095651 A1 * | 4/2010 | Tomoda | ................ F01N 3/0814 |
| | | | 60/278 |
| 2011/0289918 A1 | 12/2011 | Wada | |
| 2012/0012088 A1 | 1/2012 | Jung | |
| 2012/0017879 A1 | 1/2012 | Wu | |
| 2012/0303249 A1 * | 11/2012 | Minami | .............. F02D 41/0072 |
| | | | 701/112 |
| 2013/0219886 A1 | 8/2013 | Koch et al. | |
| 2013/0255649 A1 | 10/2013 | Serra et al. | |
| 2013/0269327 A1 | 10/2013 | Keppeler | |
| 2013/0291536 A1 | 11/2013 | Koch et al. | |
| 2014/0318514 A1 | 10/2014 | Pursifull | |
| 2015/0047347 A1 | 2/2015 | Ulrey et al. | |

FOREIGN PATENT DOCUMENTS

| | | |
|---|---|---|
| EP | 1375893 B1 | 11/2006 |
| EP | 2151570 A1 | 2/2010 |
| EP | 2472091 B1 | 10/2013 |
| WO | 2007012778 A2 | 2/2007 |
| WO | 2012048784 A1 | 4/2012 |

* cited by examiner

DUAL PATH COOLED EXHAUST GAS RECIRCULATION FOR TURBOCHARGED GASOLINE ENGINES

CROSS-REFERENCE TO RELATED APPLICATIONS

This application claims benefit of U.S. Provisional Application Ser. No. 62/130,779, filed on Mar. 10, 2015. The disclosure of the above application is incorporated herein by reference in its entirety.

FIELD

The present application relates generally to exhaust gas recirculation (EGR) systems for engines and, more particularly, to a dual path cooled EGR system for a boosted or turbocharged gasoline engine.

BACKGROUND

Exhaust gas recirculation (EGR) is a known method for $CO_2$ emissions reduction as well as reduction of Nitrogen Oxide (NOx) emissions of internal combustion engines. In general, EGR systems typically route or recirculate a portion of an engine's exhaust gas back to the intake manifold to be combined with the intake air charge. In boosted engine systems, exhaust gas is typically recirculated using an EGR system having both a high pressure EGR loop and a low pressure EGR loop. While such overall EGR systems for boosted engines work for their intended purpose, these conventional systems require separate high pressure and low pressure EGR loops, each with their own EGR cooler and associated piping, which increases the cost, complexity and weight of the associated engine and vehicle. Further, these separate loops and multiple EGR coolers are of a size that may present packaging difficulties in the under hood environments of today's vehicles. Thus, there remains a need for improvement in the relevant art.

SUMMARY

In accordance with an exemplary aspect of the invention, a dual path exhaust gas recirculation (EGR) system for an engine and associated exhaust system is provided. The engine may include, in one exemplary implementation, a throttle valve, a turbocharger and an intake system. The dual path EGR system includes, in one exemplary implementation, a common EGR intake path, a first low pressure EGR path and a second low pressure EGR path. The common EGR intake path includes an inlet fluidly connected to the exhaust system downstream of a catalyst of the exhaust system, and an EGR cooler disposed therein, where the EGR cooler is sole EGR cooler utilized with the engine. The first low pressure EGR path is fluidly coupled at its upstream end directly to the EGR cooler and at its downstream end to an inlet of a compressor of the turbocharger, where the first low pressure EGR path includes a first EGR valve. The second low pressure EGR path is fluidly coupled at its upstream end directly to the EGR cooler and at its downstream end to the intake system, thereby bypassing the turbocharger and the throttle valve of the engine. The second low pressure EGR path includes a second EGR valve. The engine includes an absence of any high pressure EGR path coupled to an exhaust manifold of the engine or a portion of the exhaust system upstream of the catalyst. The first and second EGR valves are controlled such that the first EGR valve is closed and the second EGR valve is open at low engine speed and load operating conditions thereby providing cooled low pressure EGR directly to the intake system that bypasses the turbocharger to minimize noise generation at such engine operating conditions.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As briefly discussed above, exhaust gas recirculation (EGR) is one method utilized for $CO_2$ emissions reduction and reduction of Nitrogen Oxide (NOx) emissions of internal combustion engines. In general, EGR systems typically route or recirculate a portion of an engine's exhaust gas back to the intake manifold to be combined with the intake air charge. Known benefits of EGR systems and associated control methodologies include a reduction in certain exhaust emissions, a reduction in combustion temperatures, a reduction in the potential for engine knock and an ability to increase the compression ratio of the engine.

A turbocharged or boosted gasoline engine may exhibit higher exhaust gas and combustion temperatures as compared to a naturally aspirated engine having a similar power output. If not accounted for, these higher temperatures may result in increased NOx emissions, accelerated aging of exhaust catalyst materials and/or engine knock, which is the spontaneous ignition of part of the charge. Engine knock can lead to undesirably high cylinder temperatures and pressures, as well as objectionable noise.

EGR is one approach to addressing or combating these effects. Expanding on the above discussion, EGR works by diluting the intake air charge with recirculated exhaust gas, thereby reducing the oxygen content of the charge. When such recirculated exhaust gas is utilized in place of natural air for combustion in the engine, lower combustion and exhaust temperatures can be achieved. EGR can also reduce throttling losses thereby improving fuel economy, as is known to those skilled in the art.

Figure 1:
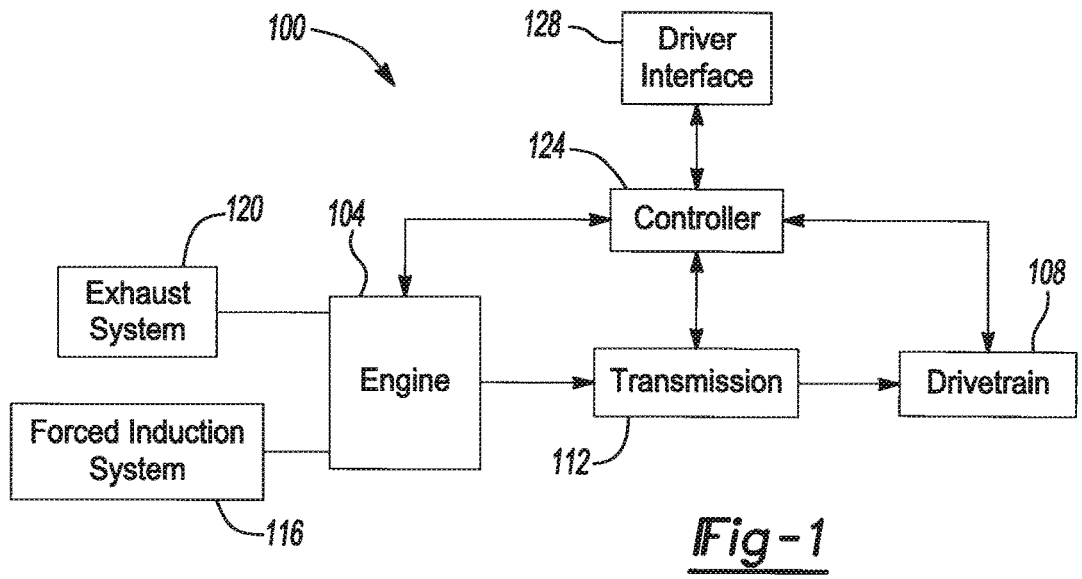
FIG. 1 is a functional block diagram of a vehicle having an internal combustion engine with a forced induction system and an exhaust system according to the principles of the present application.

Referring now to FIG. 1, a functional block diagram of an exemplary vehicle 100 is illustrated. The vehicle 100 can include an internal combustion engine 104 that generates drive torque. The drive torque generated by the engine 104 can be transferred to a drivetrain 108 of the vehicle 100 via a transmission 112, and then from the drivetrain 108 to one or more wheels, as is generally known to those skilled in the art. The drivetrain 108 can include any suitable drivetrain components (a prop shaft differential, a power transfer unit, half shafts, drive shafts, etc.). The engine 104 may include a forced induction system 116 and an associated exhaust system 120, as will be discussed in greater detail below.

The vehicle 100 can also include a controller 124 that can controls operation of the vehicle 100. It will be appreciated that while the discussion will continue with reference to controller 124, the vehicle 100 can include multiple controllers (e.g., transmission controller, engine controller, body controller, etc.) in signal communication with a vehicle communication bus or controller area network. In the example illustrated and discussed below, the controller 124 can include one or more processors and other suitable components (a communication device, memory, etc.).

Specifically, the controller 124 in this example can control the engine 104 based on a torque request via a driver interface 128 to achieve a desired drive torque. The driver interface 128 can include any suitable components for interpreting a torque request from the driver of the vehicle, e.g., an accelerator pedal. The controller 124 can also control an EGR system, e.g., EGR valve(s), of the vehicle 100 according to the techniques of the present disclosure, which are described in further detail below.

Figure 2:
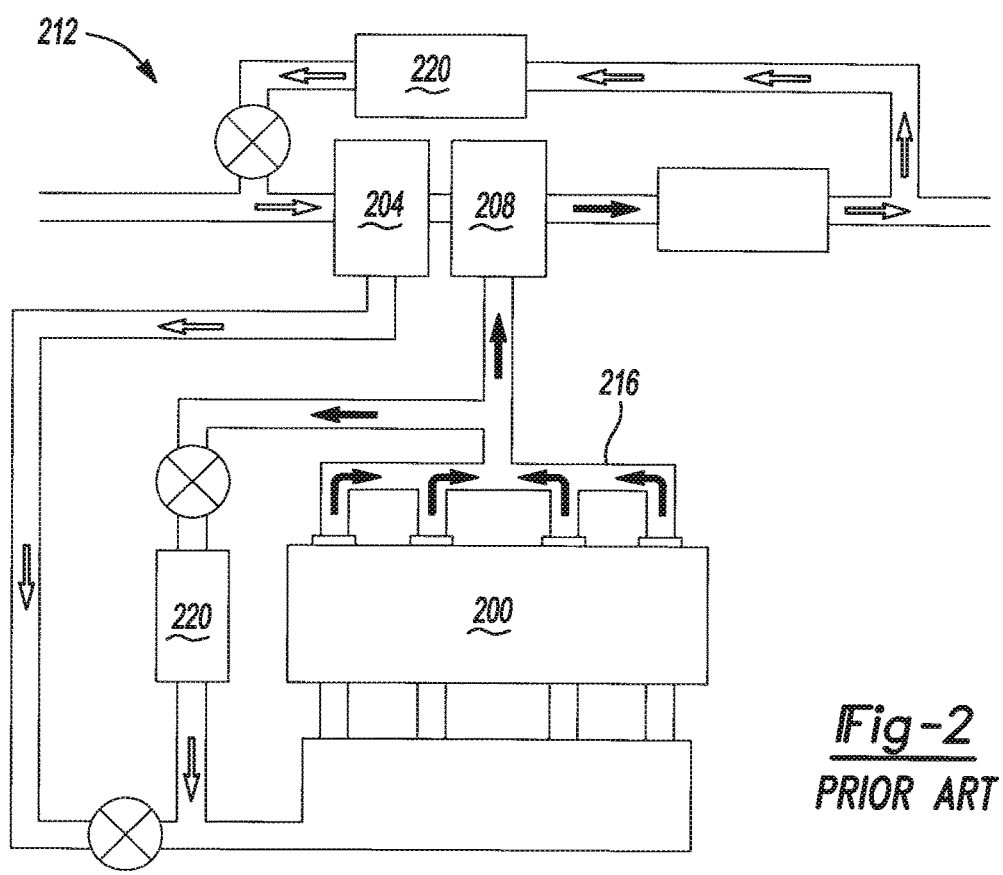
FIG. 2 is a schematic illustration of an engine associated with a forced induction system, and an exhaust gas recirculation (EGR) system having a high pressure circuit and a separate and distinct low pressure circuit.

In turbocharged or boosted gasoline engine systems, such as an engine 200 with a turbocharger compressor 204 mechanically coupled to a turbine 208, exhaust gas may be recirculated through a high pressure (HP) EGR loop or through a low pressure (LP) EGR loop of an EGR system 212, as is shown for example in FIG. 2. In the HP EGR loop, exhaust gas is recirculated from a location upstream of the turbine 208 and is mixed with intake air downstream of the compressor 204. In such a HP EGR loop, the exhaust gas is typically recirculated from the exhaust manifold 216 or at a location proximate thereto, as is also shown in FIG. 2. In the LP EGR loop, the exhaust gas is recirculated from a location downstream of the turbine 208 and is mixed with intake air upstream of the compressor 204.

As mentioned above, while such an overall EGR system 212 for turbocharged engines works for its intended purpose, the system requires separate HP and LP EGR loops (each with its own EGR cooler 220), which increases the cost, complexity and weight of the associated engine assembly. Further, in such a system, the HP EGR loop utilizes exhaust gas that has not been subject to emission control devices of the exhaust system of the associated vehicle. More specifically, since this high pressure recirculated exhaust gas has not been subjected to exhaust emission control devices, it will include burned/unburned gas and/or active radicals that may contribute to or result in uncontrolled combustion in the cylinder head and/or knocking.

Utilizing an engine having only a LP EGR system architecture plumbed to an inlet of a turbocharger also presents drawbacks. For example, while a LP only EGR system works for its intended purpose, such systems have been shown to, in some applications, generate noise when air flow is low at an inlet of the compressor, such as at low load, low RPM conditions. For example, below a certain air flow value, an engine exhaust pulsation speed may be faster than the fresh air gas flow inside the compressor inlet, which can generate a pulsation noise on the engine inlet air pipe or plumbing and through the vehicle air box. One solution to address this noise is to establish a load-speed zone where the LP EGR is not enabled. With this solution, however, this EGR disabled zone can correspond to an engine drive cycle where $CO_2$ emissions are monitored and thus the benefits of using LP EGR for CO2 reduction would not be realized.

Figure 3:
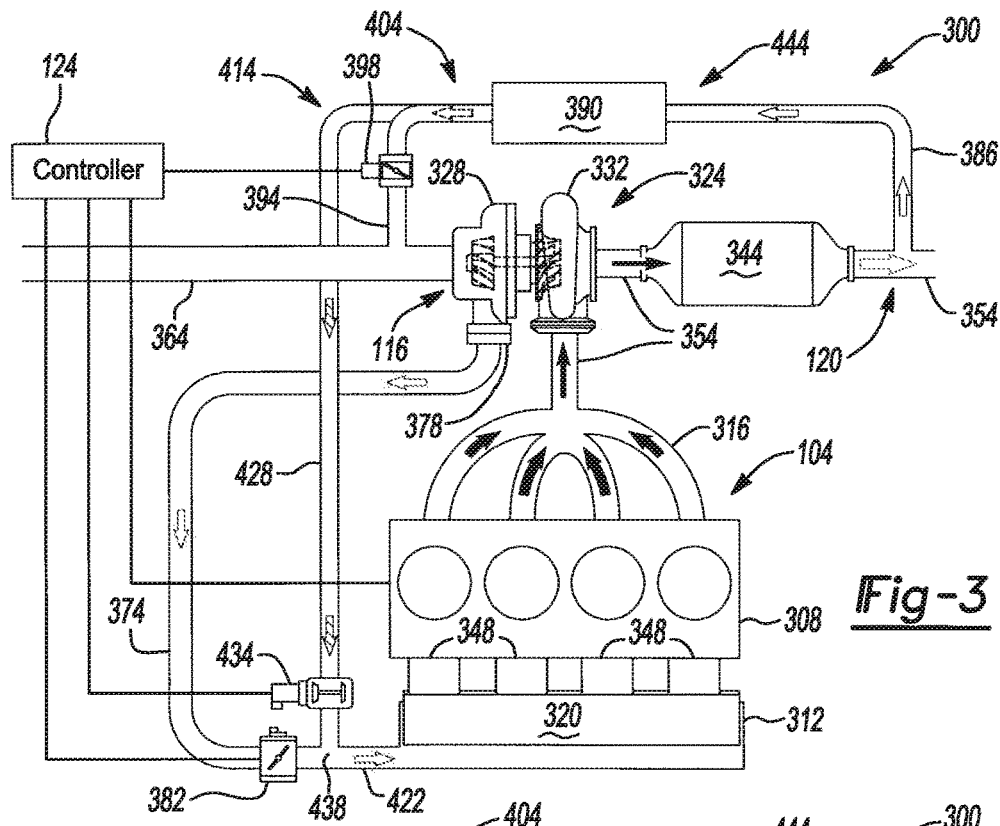
FIG. 3 is a schematic illustration of an exemplary dual path low pressure cooled EGR system associated with a boosted or turbocharged gasoline engine according to the principles of the present application.
Figure 4:
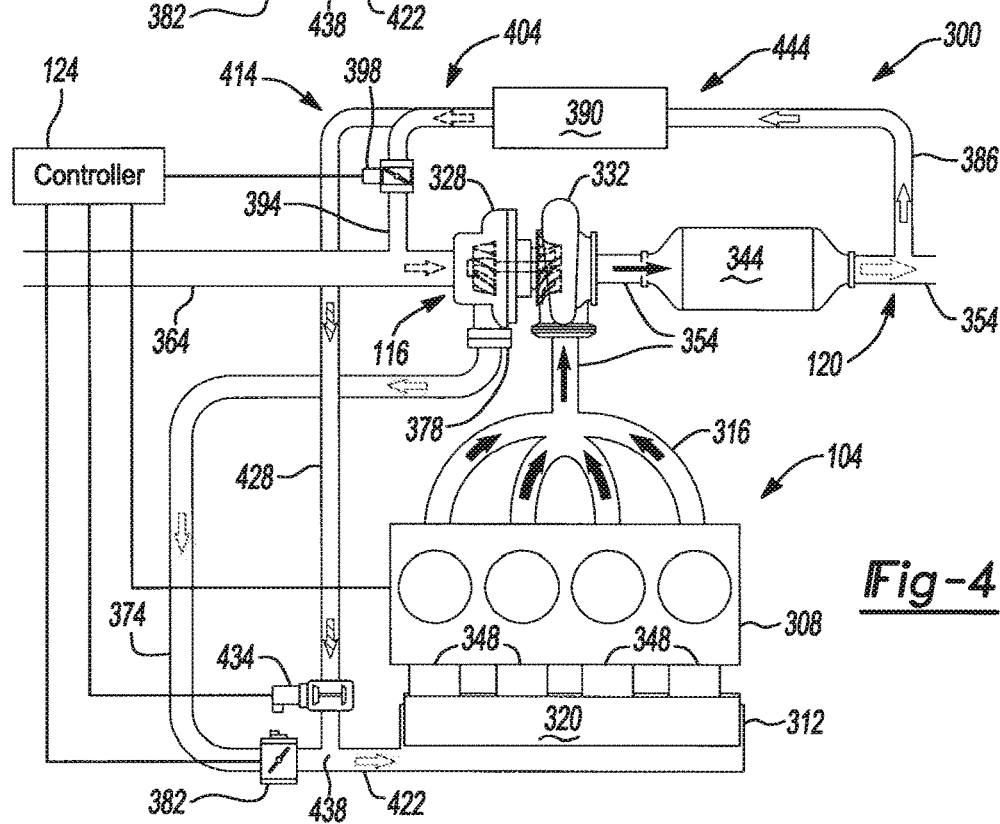
FIG. 4 is a schematic illustration of the exemplary dual path low pressure cooled EGR system of FIG. 3 showing a high-load EGR valve associated with a first path in an open position and a low-load EGR valve associated with a second path in a closed position according to the principles of the present application.
Figure 5:
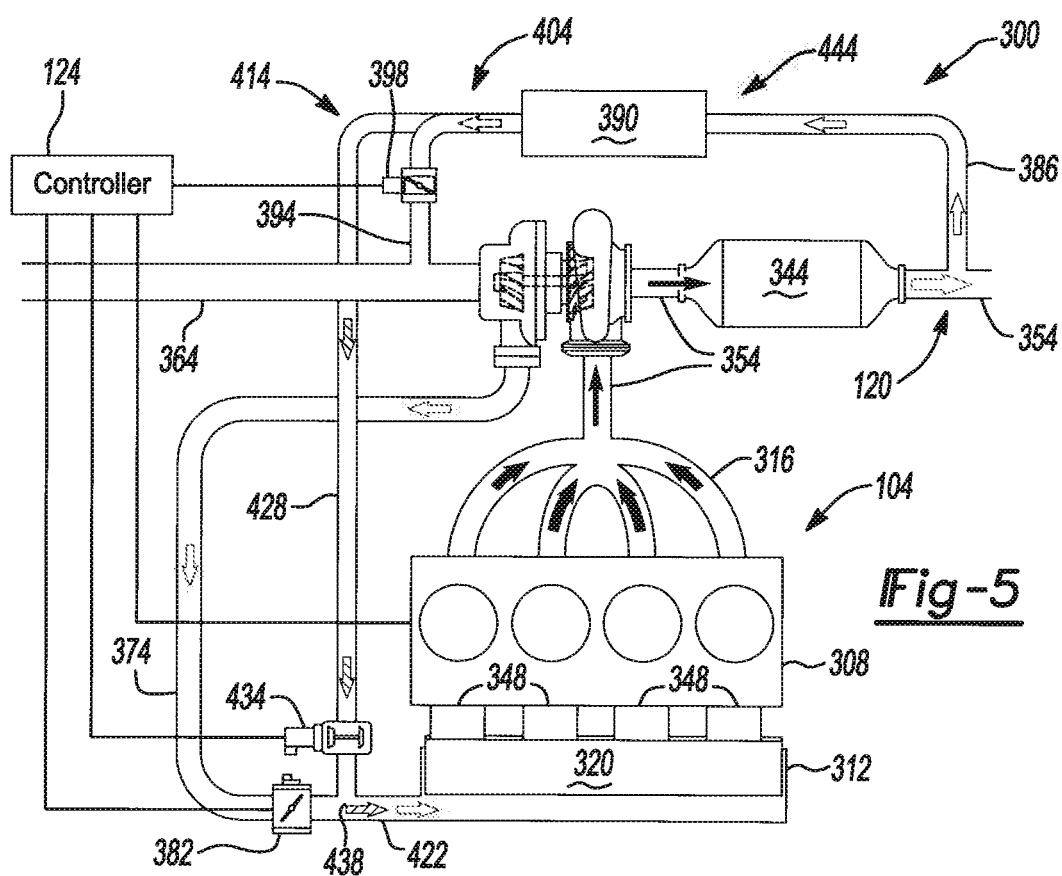
FIG. 5 is a schematic illustration of the exemplary dual path low pressure cooled EGR system of FIG. 3 showing the high-load EGR valve associated in a closed position and the low-load EGR valve in an open position according to the principles of the present application.

Accordingly, and with reference to FIGS. 3-5, a dual path low pressure cooled EGR system 300 (hereinafter, "dual path EGR system") or architecture and associated turbocharged or boosted gasoline engine 104 is schematically shown. Advantageously and as will be discussed in greater detail below, this innovative dual path EGR system 300 allows cooled and neutralized EGR from exhaust system 120 in every or substantially every running condition of the engine 104 while also reducing cost, complexity and weight of the associated engine 104.

As shown, the exemplary dual path EGR system 300 utilizes low pressure EGR that can be controllably recirculated into the turbocharger, or can selectively bypass the turbocharger and be recirculated to intake piping downstream of a throttle valve to maximize $CO_2$ reduction, among other benefits. The dual path EGR system 300 can advantageously use cooled low pressure EGR for both high load and low load conditions while utilizing one EGR cooler and providing an option for the low pressure EGR to bypass the turbocharger and selectively flow to the intake manifold downstream of and independent of the throttle valve.

Continuing with reference to FIGS. 3-5, the illustrated engine 104 and exhaust system 120 will now be discussed in greater detail. As shown, the engine 104 is a four cylinder engine, although other engine configurations are contemplated. For example, other in-line engine configurations as well as V-engine configurations are contemplated for use with the dual path low pressure cooled EGR system. Thus, while the discussion will continue with reference to the schematically shown 4 cylinder in-line engine, it will be appreciated that the discussion is not so limited to this engine configuration.

In the exemplary implementation illustrated, the engine 104 includes, among other components and features, a cylinder head 308, a cylinder block (not specifically shown), an intake manifold 312 in fluid communication with the cylinder head 308 and an exhaust manifold 316 associated with the cylinder head 308 and in fluid communication therewith. A charge air cooler 320 may be provided and optionally associated with the intake manifold 312. The forced induction system 116 includes or is provided in the form of a turbocharger 324, which includes, in one exemplary implementation, a compressor 328 mechanically coupled to a turbine 332.

An exhaust system 120 is also provided and includes at least one emission control device 344, which is shown in the exemplary system as a catalyst. Exhaust gas piping 354 is provided from the exhaust manifold 316 to the turbocharger turbine 332 and from the turbocharger turbine 332 to the emission control device 344. A flow passage or piping 364 is provided for air intake to the compressor 328 of the turbocharger 324 and piping 374 is also provided from an outlet 378 of the compressor 328 to the throttle valve 382.

With continued reference to FIGS. 3-5, structure of the dual path low pressure cooled EGR system 300 will now be discussed in greater detail. In the exemplary implementation illustrated, a first flow line or passage 386 is provided from the exhaust piping 354 downstream of the emission control device 344 to an EGR cooler 390, thereby providing low pressure EGR flow to the EGR cooler 390 that has been subjected to and/or treated/reacted by catalyst 344. It will be appreciated that while this first flow line is located downstream of the emission control device 344, it may also be fluidly coupled directly to the emission control device 344 in one exemplary implementation.

From the EGR cooler 390, a second flow line or passage 394 is provided fluidly coupling the EGR cooler to the turbocharger compressor 328. A first, low pressure EGR valve (LP-EGR valve) 398 positioned in the second flow line 394 provides for selectively controlling low pressure, neutralized EGR flow to the compressor 328. Thus, a first path 404 of the dual path EGR system provides for selectively (via control of the first EGR valve 398) recirculating exhaust gas from the exhaust system 120 downstream of the turbine 332 and the emission control device 344 directly to the turbocharger compressor inlet 328. In the exemplary implementation illustrated, the first flow path 404 selectively directly recirculates the exhaust gas from the location downstream of the emission control device 344 directly to the compressor inlet 328 while passing through the EGR cooler 390 and the first EGR valve 398 in an open position. In this example implementation, the first flow path 404 includes only piping 386 and 394 together with EGR cooler 390 and first EGR valve 398.

A second path 414 of the dual path EGR system 300 fluidly couples the EGR cooler 390 to the intake piping/manifold 312 downstream of the throttle valve 382 and upstream of the cylinder head 308 intake ports 348. For example only, the second path 414 may be coupled directly to the intake manifold 312, to the charge air cooler 320 associated therewith, or to the intake piping 422 downstream of the throttle valve 382 and upstream of the charge air cooler 320 and/or intake manifold 312. In the exemplary implementation illustrated, the EGR cooler 390 is directly coupled to the intake piping 422 or intake manifold 312 downstream of the throttle valve 382 and upstream of the charge air cooler 320 via a third flow line or passage 428 of the second path 414 of the dual path EGR system 300.

A second low pressure EGR valve (LP EGR valve) 434 is positioned in the third flow line 428 upstream of an intersection 438 of the third flow line 428 with the intake piping 422 downstream of the throttle valve 382. In other words, the second EGR valve 434 is positioned in the third flow line 428 so as to selectively controllably regulate exhaust gas flowing therethrough independent of the throttle valve 382 and fluid flowing through the throttle valve 382, such as from the first flow path and/or compressor 328 via piping 374. Thus, the second flow path 414 of the dual path EGR system 300 selectively (via control of the second EGR valve 434) recirculates exhaust gas from the exhaust system 120 downstream of the turbine 332 and the emission control device 344 to the engine intake 312 downstream of the throttle valve 382 and upstream of the charge air cooler 320.

In operation, the dual path EGR system or architecture 300 provides first and second cooled EGR flow paths 404, 414 that utilize exhaust gas from downstream of the emission control device 344 with only one EGR cooler 390, thereby reducing cost and weight and requiring less packaging space for the powertrain. In one exemplary implementation, the dual path EGR architecture 300 utilizes only one low pressure EGR connection (e.g., downstream of the emission control device) and the associated engine 104 does not include any high pressure EGR connection (e.g., at or just downstream of the exhaust manifold) or system.

In other words, the dual path EGR system 300 utilizes only one exhaust system or exhaust gas connection, which is downstream of the emission control device 344. This single exhaust system connection is accomplished by first piping 386 and provides a common EGR inlet path 444 up to and including the EGR cooler 390. From the common path 444, cooled recirculated exhaust gas can flow into one of two paths 404, 414 of the dual path EGR system 300. The first path 404 includes the second flow line or piping 394 that provides a direct connection into the compressor 328 via the first low pressure EGR valve 398. The second path 414 includes the third flow line or piping 428 that provides a direct path to the intake piping 422 or intake manifold 312 through only the second low pressure EGR valve 434, bypassing the throttle valve 382 and compressor 328 of turbocharger 324.

Using only cooled EGR from a position at or downstream of the emission control device 344 outlet provides for more stable combustion and improved knock performance. The dual path EGR system 300 also provides for utilizing the cooled low pressure EGR in the low speed, low load zone discussed above by controlling the EGR valves 398, 434 to provide EGR via only the second flow path 414 during this operating scenario, thereby bypassing the turbocharger 324 and throttle valve 382 and reducing/limiting the risk of undesirable noise. Such an operating scenario is shown in FIG. 5. Further, for higher engine load and speed operating conditions, the first EGR valve 398 can be opened and the second EGR valve 434 can be closed, thereby providing cooled and neutralized EGR directly to the compressor 328 inlet, as shown in FIG. 4.

In addition, the second EGR valve 434 may be selectively controlled to function as a waste gate, blow off or dump valve, providing for eliminating a conventional dump valve. For example, in this exemplary optional implementation, the second EGR valve 434 and the throttle valve 382 could be controlled to open positions at a fuel injection cut-off or pedal let-off condition, thereby providing for gas pressure at the compressor outlet 378 to drop in a rapid fashion to avoid potential surge related noise. The second EGR valve 434 may also be optionally used in a high load (i.e., throttle valve fully or substantially fully open), low engine speed operating condition to increase flow through the compressor 328 and shift a surge limit of the compressor 328.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A dual path exhaust gas recirculation (EGR) system for an engine and associated exhaust system, the engine including a throttle valve, a turbocharger and an intake system, the dual path EGR system comprising:
   a common EGR intake path having an inlet fluidly coupled to the exhaust system downstream of a catalyst of the exhaust system;
   an EGR cooler disposed in the common EGR intake path;

a first low pressure EGR path fluidly coupled at its upstream end to the EGR cooler and at its downstream end to an inlet of a compressor of the turbocharger, the first low pressure EGR path including a first EGR valve;

a second low pressure EGR path fluidly coupled at its upstream end to the EGR cooler and at its downstream end to the intake system thereby bypassing the turbocharger and the throttle valve of the engine, the second low pressure EGR path including a second EGR valve;

a controller in communication with the engine, throttle valve and first and second EGR valves;

wherein the engine includes an absence of any high pressure EGR path that is connected to an exhaust manifold of the engine or a portion of the exhaust system upstream of the catalyst;

wherein the first and second EGR valves are controlled such that the first EGR valve is closed and the second EGR valve is open at low engine speed and load operating conditions thereby providing cooled low pressure EGR directly to the intake system that bypasses the turbocharger and throttle valve to minimize noise generation at said operating conditions; and wherein the controller is configured to, upon determining a fuel cut-off or pedal-let-off condition, control the throttle valve to open and the second EGR valve to open to rapidly reduce pressure at an outlet of the compressor.

2. The EGR system of claim 1, wherein the first and second EGR valves are controlled such that the first EGR valve is opened and the second EGR valve is closed at high load engine operating conditions thereby providing cooled low pressure EGR directly to the inlet of the compressor via the first low pressure EGR path.

3. The EGR system of claim 1, wherein the second low pressure EGR path is a discrete path providing a direct controllable connection from the EGR cooler to the intake system, and wherein the downstream end of the second low pressure EGR flow path is coupled to the intake system downstream of the throttle valve.

4. The EGR system of claim 3, wherein the first low pressure EGR path is a discrete path providing a direct controllable connection from the EGR cooler to the inlet of the compressor.

5. The EGR system of claim 3, wherein the engine further comprises a charge air cooler associated with the intake system, and wherein the downstream end of the second low pressure EGR flow path is coupled to the intake system downstream of the throttle valve and upstream of the charge air cooler.

6. The EGR system of claim 1, further comprising controlling the second EGR valve to function as a blow off valve such that the engine system includes an absence of a separate blow-off valve.

7. The EGR system of claim 1, wherein the EGR system is the only EGR system included with the engine and includes the dual path EGR system comprising only the first and second low pressure EGR paths.

* * * * *